(12) United States Patent
Gilbert et al.

(45) Date of Patent: Jul. 14, 2015

(10) Patent No.: US 9,081,481 B2

(54) ADJUSTING LIST VIEWS BASED ON LIST SORTING AND ITEM HIGHLIGHTING

(75) Inventors: Fred Gilbert, Mountain View, CA (US); Andrew Oplinger, Mountain View, CA (US)

(73) Assignee: Google Inc., Mountain View, CA (US)

(*) Notice: Subject to any disclaimer, the term of this patent is extended or adjusted under 35 U.S.C. 154(b) by 1208 days.

(21) Appl. No.: 12/816,872

(22) Filed: Jun. 16, 2010

(65) Prior Publication Data

US 2015/0169699 A1 Jun. 18, 2015

(51) Int. Cl.
  G06F 3/048 (2013.01)
  G06F 3/0482 (2013.01)
  G06F 3/00 (2006.01)
  G06F 3/0484 (2013.01)

(52) U.S. Cl.
  CPC .......... *G06F 3/0482* (2013.01); *G06F 3/04842* (2013.01)

(58) Field of Classification Search
  None
  See application file for complete search history.

(56) References Cited

U.S. PATENT DOCUMENTS

| | | | | |
|---|---|---|---|---|
| 5,485,197 | A * | 1/1996 | Hoarty | 725/37 |
| 5,926,178 | A * | 7/1999 | Kurtenbach | 715/834 |
| 6,448,985 | B1 | 9/2002 | McNally | |
| 6,544,123 | B1 * | 4/2003 | Tanaka et al. | 463/36 |
| 6,618,063 | B1 * | 9/2003 | Kurtenbach | 715/834 |
| 6,947,959 | B1 * | 9/2005 | Gill | 715/202 |
| 7,054,870 | B2 * | 5/2006 | Holbrook | 1/1 |
| 7,188,317 | B1 * | 3/2007 | Hazel | 715/804 |
| 7,383,503 | B2 * | 6/2008 | Banks | 715/273 |
| 7,404,152 | B2 * | 7/2008 | Zinn et al. | 715/864 |
| 7,469,388 | B1 | 12/2008 | Baudisch et al. | |
| 7,555,476 | B2 * | 6/2009 | Holbrook | 1/1 |
| 7,614,016 | B2 * | 11/2009 | Wong et al. | 715/854 |
| 7,707,197 | B2 * | 4/2010 | Kaasten et al. | 707/705 |
| 7,725,839 | B2 * | 5/2010 | Michaels | 715/836 |
| 7,769,794 | B2 * | 8/2010 | Moore et al. | 707/831 |
| 7,925,682 | B2 * | 4/2011 | Moore et al. | 707/831 |
| 8,161,410 | B2 * | 4/2012 | Bray | 715/848 |
| 8,473,511 | B2 * | 6/2013 | Arrouye et al. | 707/775 |
| 8,621,393 | B2 * | 12/2013 | Chaudhri et al. | 715/835 |
| 8,631,354 | B2 * | 1/2014 | Edge et al. | 715/863 |
| 2002/0054164 | A1 * | 5/2002 | Uemura | 345/848 |
| 2002/0075312 | A1 * | 6/2002 | Amadio et al. | 345/764 |
| 2002/0145623 | A1 * | 10/2002 | Decombe | 345/734 |
| 2004/0177319 | A1 * | 9/2004 | Horn | 715/501.1 |
| 2005/0044509 | A1 * | 2/2005 | Hunleth et al. | 715/834 |
| 2005/0091596 | A1 * | 4/2005 | Anthony et al. | 715/712 |
| 2005/0210410 | A1 * | 9/2005 | Ohwa et al. | 715/821 |
| 2005/0229102 | A1 * | 10/2005 | Watson et al. | 715/739 |

(Continued)

OTHER PUBLICATIONS

Yelp, May 22, 2010, 4 pages.*

(Continued)

*Primary Examiner* — Yongjia Pan
(74) *Attorney, Agent, or Firm* — Fish & Richardson P.C.

(57) ABSTRACT

The present disclosure is directed to a system and method for dynamically updating list views. In some implementations, a method for expanding items includes presenting media display including a list of a plurality of items. The presented list includes an expanded view of a first item from the plurality of items at a predefined position in the media content. A request to scroll to a second item from the plurality of items is received. A view of the second item is automatically expanding in response to at least the request. The expanded view of the second item is presented at the predefined position in the media display.

25 Claims, 3 Drawing Sheets

(56) References Cited

U.S. PATENT DOCUMENTS

| | | | |
|---|---|---|---|
| 2005/0289133 A1* | 12/2005 | Arrouye et al. | 707/4 |
| 2006/0048076 A1* | 3/2006 | Vronay et al. | 715/850 |
| 2007/0011623 A1 | 1/2007 | Billmaier et al. | |
| 2007/0061746 A1* | 3/2007 | Folting et al. | 715/764 |
| 2008/0307343 A1* | 12/2008 | Robert et al. | 715/765 |
| 2009/0183108 A1* | 7/2009 | Arrouye et al. | 715/781 |
| 2009/0307306 A1* | 12/2009 | Jalon et al. | 709/203 |
| 2011/0029925 A1* | 2/2011 | Robert et al. | 715/830 |
| 2011/0041094 A1* | 2/2011 | Robert et al. | 715/810 |
| 2011/0055759 A1* | 3/2011 | Robert et al. | 715/825 |
| 2011/0289459 A1* | 11/2011 | Athans et al. | 715/854 |

OTHER PUBLICATIONS

Download First Look: Yelp 2.0 for iPhone, Apr. 27, 2009, 2 pages.*
Sean Wonjoon Choi, "Dynamically Adjusting List Views" U.S. Appl. No. 12/180,721, filed Jul. 28, 2008.
Sanjay Mavinkurve, List View Mock Depicting a Fisheye UI, Jan. 30, 2007.
Picture of a Sony Ericsson Phone with Fisheye UI, which was in public use in the United States as of Jun. 15, 2010, 1 page.

* cited by examiner

ADJUSTING LIST VIEWS BASED ON LIST SORTING AND ITEM HIGHLIGHTING

TECHNICAL FIELD

This specification relates to content presentation in list views.

BACKGROUND

Content delivery over the Internet continues allows computer users to receive search results, e-mail, news, games, entertainment, music, books, and web pages—all with a simple Internet connection. Internet users also have access to services including maps, shopping links, images, blogs, local search, satellite images, group discussions, hosted content, and e-mail. Data relating to locally stored resources can also be accessed and displayed even without an Internet connection using software stored on a computer. When a user accesses these respective services, the content provided by the service is typically related to a particular topic that can, for example, be presented in a list including expandable items. By expanding and contracting the items, the user can view additional information for selected items.

SUMMARY

In general, one aspect of the subject matter described in this specification can be embodied in methods that include the actions of receiving an identification of a selected sort criterion for listing items, wherein a plurality of fields of metadata is associated with each item, and generating a user interface display by operation of a computer, wherein the user interface display includes a first list of items sorted according to the selected sort criterion. The first list of items includes at least a first item and a second item and further includes an expanded view of the first item and an unexpanded view of other items in the first list of items including at least the second item. The expanded view includes a display of one or more predetermined fields of metadata not included in the unexpanded view. The one or more predetermined fields of metadata are defined based on the sort criterion that is selected. A request to move display focus to the second item in the first list of items is received, and an expanded view of the second item is presented in response to the request. The expanded view of the second item includes a display of the one or more predetermined fields of metadata not included in the unexpanded view. Other embodiments of this aspect include corresponding systems, apparatus, and computer programs recorded on computer storage devices, each configured to perform the operations of the methods.

These and other embodiments can each optionally include one or more of the following features, alone or in combination. The selected sort criterion is identified from the plurality of fields of metadata. The unexpanded view includes data from a field of metadata identified as the selected sort criterion. The identification of the one or more predetermined fields of metadata to be included in the expanded view is based on which of the plurality of fields of metadata is identified as the selected sort criterion. An identification of a second selected sort criterion for listing items is received, and the user interface display is modified to sort items in a second list of items according to the second selected sort criterion. The modified user interface display includes an expanded view of a particular item in the second list of items and an unexpanded view of other items in the second list of items, and the expanded view of the particular item includes a display of a field of metadata not included in the unexpanded view. The expanded view of the particular item includes a display of a field of metadata not included in the expanded view of the first item in the first list of items. The view of the first item is changed from the expanded view to the unexpanded view upon presenting an expanded view of the second item. The expanded view of the first item and the expanded view of the second item are each presented at a predefined relative position in the user interface display. Each item in the listing of items includes a search result in a set of search results. A user parameter is received and, for each item in the first list of items, a value for a field of metadata is generated based on the user parameter. The value for at least one item in at the expanded view and/or the unexpanded view is displayed. The selected sort criterion includes a selected combination of fields of metadata from the plurality of fields of metadata. The user interface display is presented on a handheld mobile device. The selected sort criterion is identified from a predefined subset of the plurality of fields of metadata, and a user interface component identifying the predefined subset is displayed, wherein the selected sort criterion is identified through a user interaction with the user interface component.

Another aspect of the subject matter described in this specification can be embodied in an article including a computer-readable storage medium storing instructions for causing data processing apparatus to receive a list of items for presentation on a display, wherein the list of items includes at least a first item and a second item and is sorted according to a selected sort criterion and each item includes an associated plurality of fields of metadata, and to generate a display including an expanded view of the first item and an unexpanded view of other items in the list of items including at least the second item. The expanded view displays a value of one or more predetermined fields of metadata associated with the item not included in the unexpanded view, and the one or more predetermined fields of metadata are identified based on the sort criterion that is selected. The instructions are adapted to further cause data processing apparatus to modify the display to include an expanded view of the second item and an unexpanded view of other items in the list of items including at least the first item.

These and other embodiments can each optionally include one or more of the following features, alone or in combination. The computer-readable storage medium further stores instructions for causing data processing apparatus to receive a request to modify the display to include an expanded view of the second item and an unexpanded view of other items in the list of items and initiate the modification in response to the request. The request includes a request to move display focus to the second item in the list of items. The computer-readable storage medium further stores instructions for causing data processing apparatus to receive an identification of the selected sort criterion and sort the list of items according to the selected sort criterion. The computer-readable storage medium further stores instructions for causing data processing apparatus to generate a user interface component adapted to allow a user to identify the selected sort criterion from a set of available sort criteria, wherein the set of available sort criteria corresponds to a predefined subset of the plurality of fields of metadata. The computer-readable storage medium further stores instructions for causing data processing apparatus to present, in the expanded view, one or more values from a predetermined subset of the fields of metadata corresponding to each available sort criterion, the predetermined subset of the fields of metadata for one available sort criterion being different from the predetermined subset of the fields of metadata for at least one other available sort criterion. The computer-readable storage medium further stores instructions for causing data processing apparatus to generate the list of items in response to a search request. The selected sort criterion is selected from the plurality of fields of metadata and the unexpanded view includes a display of only an identification of the item and the value of the metadata selected as the selected sort criterion.

Another aspect of the subject matter described in this specification can be embodied in a system that includes one or more computers and one or more data storage devices storing instructions for causing at least one of the computers to perform operations including receiving an identification of a selected sort criterion for listing items, wherein a plurality of fields of metadata are associated with each item; generating a user interface display, wherein the user interface display includes a list of items including at least a first item and a second item sorted according to the selected sort criterion and further includes an expanded view of the first item and an unexpanded view of other items in the list of items including at least the second item; receiving a request to change display focus to the second item in the list of items; and presenting an expanded view of the second item in response to the request. The expanded view displays one or more predetermined fields of metadata not included in the unexpanded view, the one or more predetermined fields of metadata are predetermined based on the sort criterion that is selected, and the expanded view of the second item includes a display of the one or more predetermined fields of metadata not included in the unexpanded view.

These and other embodiments can each optionally include one or more of the following features, alone or in combination. The one or more data storage devices store instructions for further causing at least one of the computers to identify the one or more predetermined fields of metadata included in the expanded view based at least in part on the selected sort criterion. At least one of the one or more computers includes a handheld mobile device having a display screen adapted to display the user interface display and a user interface adapted to receive input from a user including identifications of selected sort criteria and requests to change display focus. A data storage device of the handheld mobile device stores instructions for specifying which of the plurality of fields of metadata are selectively displayed in the expanded view based on which of a plurality of available sort criteria is selected. The system includes a search engine adapted to receive a search request and to generate search results including the items in the list of items, wherein each item includes identifying information for at least one of the search results.

Implementations may include systems, methods, software products, and machine-readable media storing instructions for causing data processing apparatus to perform operations. The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
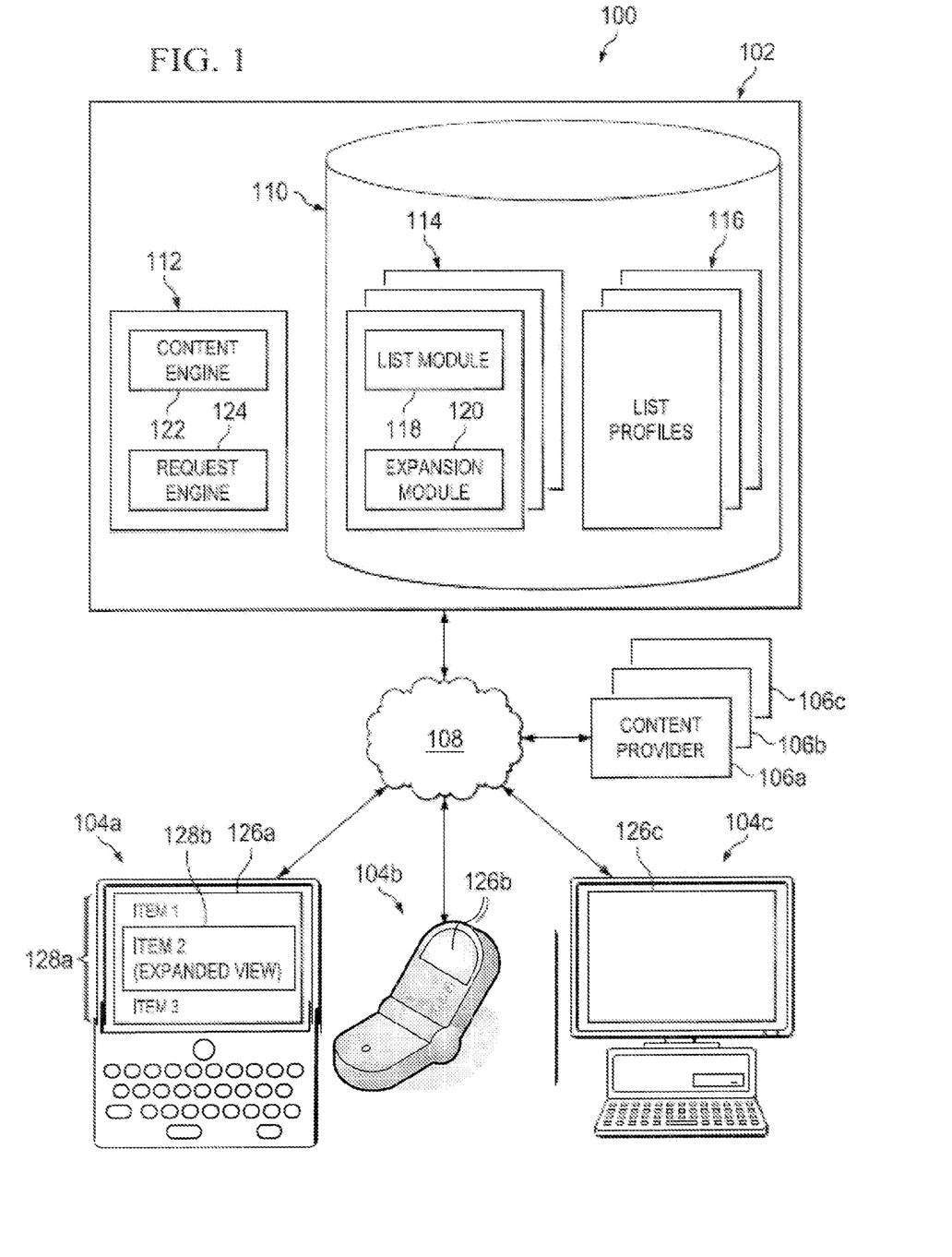
FIG. 1 is a block diagram illustrating an example system for presenting a list of items.

FIG. 1 is a block diagram illustrating an example system 100 for presenting a list of items. The system 100 can present a list of multiple items that automatically expand (e.g., to present more information) and contract (to present less information) in response to user events (e.g., scrolling between items). The user interface display 128a can include a web page or an electronic document displayed within an application window (e.g., on a browser). Such techniques can conserve screen space, which may be valuable on all sorts of displays but particularly valuable on devices with small screens, e.g., mobile or handheld devices. The techniques can be used on devices with touch screen capabilities or on devices that allow user navigation through other types of user interface controls (e.g., roller balls, arrow keys or buttons, or other scrolling or navigation devices).

In some implementations, the unexpanded items can present titles of, for example, websites, images, videos, blogs, news, books, maps, Uniform Resource Locators (URLs), merchandise, merchants, real estate listings, locations, and/or other searchable content. An expanded item can include a hyperlink, a description of the associated content, and/or other additional information about the item. For example, the content description may include a snippet of a news article presented by a web page, a web page, and/or other content. Web-based aggregators may be capable of searching online and/or offline content and presenting the aggregated content to users through, for example, a list view. In some implementations, the system 100 automatically switches between expanded views and unexpanded views of, for example, aggregated items in response to a user event (e.g., scrolling using a mouse, arrow key, touch screen, or roller; selection using a mouse, touch screen, or other user interface device).

The system 100 can automatically contract an initially expanded item and automatically expand a next item as the user scrolls or otherwise navigates through a list. In some implementations, after scrolling from an initially expanded item to the next item in the list, a top line of the expanded view of the next item can be presented at the same position that the top line of the initially expand item was previously presented. By substantially maintaining expanded views of items at the same position as a user scrolls through a list, the user may substantially maintain eye level at a same position on a screen as the system 100 automatically expands and contracts items as a user scrolls through a list. Alternatively or in addition, the expanded item can be designated by highlighting, a shaded box, or some other designation of which item in the list is currently selected for expansion. In some implementations, only a single item selected for current display focus is presented in expanded form, while all other items in the list are presented in unexpanded form. In other implementations, more than one item can be selected for display focus and/or presented in expanded form. For example, when a user scrolls to a particular item in the list, the particular item, the immediately preceding item, and the immediately following item can all be presented in expanded form while other items in the list are presented in unexpanded form.

The system 100 illustrated in FIG. 1 includes a search engine server 102, client devices 104 (including a PDA 104a, a mobile phone 104b, and a desktop computer 104c), and content providers 106a-c capable of communicating through a network 108, e.g., a local area network, the Internet, and/or a wireless network. The search engine server 102 includes memory 110 and a processor 112. Typically, the search engine server 102 connects to numerous other servers that store information about available resources, e.g., web pages, locations, merchants, or other searchable content. In some implementations, the search engine server 102 is implemented in multiple different servers that communicate with each other to perform the functions of the search engine server 102. The search engine server 102 generates web pages 114 or other electronic documents 114 for serving to client devices 104. An overall list of items (e.g., the top 50 or 500 items identified in response to a search request) can be presented in a set of electronic documents 114, such that each electronic document contains a different portion of the overall list of items. The electronic documents 114 in the set can then be served to a requesting client device 104 sequentially as a user requests additional items. In other implementations, a single electronic document may contain all of the items to be returned in response to a request. In some cases, a content provider 106 can be one or more databases of information associated with the search engine server 102. The information in the databases may include data (e.g., product information) aggregated from one or more third party websites. In some implementations, the list of items can be generated by the server 102 from a predefined set of items rather than being generated as a result of a search request.

The processor 112 of the search engine server 102 includes a content engine 122 for aggregating content (e.g., producing search results) to generate the electronic documents 114 with list views of the content. The processor 112 also includes a request engine 124 for processing client requests (e.g., search requests) and providing the electronic documents 114 to the clients 104a-c in response to requests. The clients 104a-c include graphical user interfaces (GUIs) 126a-c configured to present the user interface display 128a including graphical elements 128b corresponding to individual expanded (and contracted) items.

In some implementations, the content engine 122 may identify content criteria in one or more list profiles 116 and transmit a request for content to one or more content providers 106 based, at least in part, on the content criteria. In response to at least the content request, the content provider 106 may identify content in accordance with the content criteria. For example, the content provider 106 may identify a topic (e.g., science news) and identify one or more news articles associated with the topic. The content providers 106 may transmit responses including information (e.g., title, hyperlink, description) identifying content associated with the content criteria. In response to at least receiving the content information, the content engine 122 can generate the electronic document 114 with the list module 118 and the expansion module 120 based, at least in part, on the identified content. The request engine 124 may receive a search request or a request for the electronic document 114 and transmit the appropriate electronic document 114 to the client 104 for display through the GUI 126.

Each electronic document 114 can include a list of items generated in response to a search request using information about available resources. For example, the available resources can include content from one or more of the content providers 106. The electronic documents 114 also include, for each item in the list, multiple fields of metadata relating to that item. For example, a list of products may include categories of metadata that provide additional information about the product, e.g., price, product features, color, size, product type, merchant, and brand. One or more of the electronic documents 114 can be stored at least temporarily in memory 110 for serving to the client devices. The memory 110 can also store list profiles 116 that include or identify instructions for aggregating content from the content providers 106 and/or for formatting content in the electronic documents 114.

The electronic documents 114 further include a list module 118 for presenting a list view in the user interface display 128a and an expansion module 120 for automatically expanding and contracting items in the list view in response to user interaction using a user interface control device, e.g., a mouse, touch screen, roller ball or wheel, or arrow keys. The list module 118 may present a list of items 128a through the GUI 126, and the expansion module 120 may automatically present an expanded view of an item in an expansion field 128b. The list module 118 can provide an indication of display focus (e.g., highlighting of a currently selected item) and can support moving display focus between different items in the list. The list module 118 also provides a user interface component for allowing a user to select a sort criterion from a list of available sort criteria. For example, the available sort criteria can include the categories of metadata associated with the list of items. In some implementations, the available sort criteria may be a limited or selected subset of the categories of metadata, e.g., categories that relate to (or that are subject to sequencing according to) time, proximity, alphabetical ordering, or other categories of metadata that have a logical sequence. By selecting a sort criterion, a user can control a sort order for items in the list view.

The list module 118 automatically re-sorts items in the list each time a user selects a different sort criterion. For example, if a user selects a price criterion for a product list, the list module 118 can sort the products in the list according to price. In some implementations, the sort criteria can include additional parameters for use in refining the sort order, e.g., sort by price high to low, sort by price low to high, or sort by price within a predetermined or user selected price range. In addition, a sort criterion can be based on some combination of available metadata categories (e.g., total cost of price and shipping in a list of products). The re-sorted list can be generated locally at the client device 104 based on the items in the electronic document 114 or documents 114 already retrieved and stored on the client device 104. In some implementations or for certain sort criteria, the list module 118 can request that the server 102 generate and return a new electronic document 114 or set of electronic documents in response to the selection of a new sort criterion.

The expansion module 120 automatically controls which items in the list are expanded and which are contracted as a user scrolls or otherwise navigates between the items in the list view. The unexpanded view of items in the list may include at least a title or identifier for each item and a value (e.g., a numerical value, a text value, an image, or some other value) for that item of the metadata category selected as the sort criterion, while the expanded view of an item includes the values of additional metadata categories for that item relative to the unexpanded view. Which additional metadata categories are included for a particular sort criterion can be predetermined based on the particular sort criterion. For example, which metadata categories are included in the expanded and unexpanded views can be defined in the list profiles 116 and/or in the electronic documents 114. Thus, the expanded view may present the values of different sets of metadata categories for different sort criteria. Likewise, the unexpanded view may also present, for example, the values of one or two additional metadata categories (but still fewer than the expanded view) that are determined based on which sort criterion is used.

In response to at least a user scrolling from the expanded item to a next item, the expansion module 120 may automatically expand the next item and automatically contract or unexpand the previous item. To identify a next item or a first and second item, the expansion module 120 may not expand in a specific order in the list and may simply refer to a sequence of expansion. For example, the first item to be expanded might be the fourth item in the list and the second or next item may not be the third or fifth item. The expansion module 120 may wait for a period of time before expanding the next item. Moreover, the third item to be expanded can be the same as the first item (e.g., if the user scrolls down and then back up). In addition, the expansion module 120 may present the expanded next item at the same position in the GUI 126 as the previously expanded item. For example, the expansion module 120 may present a first line of the expanded next item at the top of the expansion field 128b where a first line of the previously expanded item was previously presented. In some cases, instead of generating the expanded view, the expansion module 120 may retrieve a predefined expanded view locally stored on the client 104 or remotely stored on the server 102.

Generally, the electronic documents 114 define user interface displays through which list views can be presented to users of the client devices 104. In general, the electronic documents 114 include any machine readable and machine storable instructions and/or data that may generate or be used to generate a display through the GUI 126. The electronic documents 114 may be a file, a combination of files, one or more files with embedded links to other files, or other configurations. The electronic documents 114 may include text, audio, image, video, animation, and other attributes. The electronic documents 114 can include source code or object code for generating a display that presents list views that automatically expand and/or contract in response to at least a user event (e.g., mouse-wheel scrolling). The electronic document 114 may include elements written in one or more programming languages, e.g., HTML, CSS, JavaScript™ software and/or any type of code for, for example, presenting dynamic web pages, e.g., Flash™ or ActionScript™ software. The list module 118 and the expansion module 120 can include software configured to present list views that include items that are expandable, for example, using JavaScript™, Flash™, or other similar software. For example, the list module 118 may use software to generate a list view 128a to a user in response to at least a request for an associated electronic document 114. Thus, the list module 118 and the expansion module 120 can execute instructions to generate a list view 128a of multiple items including at least a subset of unexpanded items; present information (e.g., title and metadata corresponding to a sort criterion) for the unexpanded items; expand the view of an unexpanded item to present additional information (e.g., image, hyperlink, description); contract an expanded view and expand a next item in response to an event (e.g., scroll event); present an expanded view (e.g., in expansion field 128b); and/or other functions.

When presenting a list of items, the list module 118 may initially present a list of titles for previously-identified content. To generate an expanded view, the expansion module 120 can identify locally and/or remotely stored metadata and generate the expanded view based, at least in part, on the additional information. For example, the expansion module 120 may identify information, e.g., a hyperlink, a description, and/or other additional information and populate an expanded view of the item with the additional information.

The expansion module 120 may determine that a particular item is scrolled to or past a threshold location and automatically contract a currently expanded item and expand the particular item. In other words, the expansion module 120 may determine which items should be expanded and which should be contracted based on the location of the items on a display screen. In some implementations, the expansion module 120 may identify an expansion threshold location associated with triggering an expansion event, determine that a listed item is scrolled to or past the expansion threshold location and automatically contract a currently expanded item and expand the listed item in the list. In some implementations, the expansion threshold location can be based on a point, a line, a perimeter, and/or an area. Alternatively or in addition, the expansion module 120 may receive other user input to identify that a user has scrolled or navigated to a particular listed item. For example, the expansion module 120 may base expansion or contraction on an arrow keystroke, an angular rotation of a mouse wheel, movement of a user's finger on a touch screen, and/or other user actions. In addition, the expansion module 120 can base the expansion or contraction on a direction of a scroll to determine the next item in a list to be expanded.

List profiles 116 can include instructions or settings for identifying content stored or provided by the content providers 106 that is to be included in the set of metadata for each item in a list. Profiles 116 may be stored in one or more tables stored in a relational database described in terms of SQL statements or scripts or in other data structures. In short, profiles 116 may include one table or file or a plurality of tables or files stored on one computer or across a plurality of computers. Moreover, profiles 116 may be stored locally or remotely with respect to the search engine server 102.

Processor 112 executes instructions and manipulates data to perform operations of the server 102. Although FIG. 1 illustrates a single processor 112 in the server 102, multiple processors 112 may be used according to particular needs. In the illustrated implementation, the processor 112 executes the content engine 122 and the request engine 124, for example, in response to a request or input from a user of the server 102 or another computer system coupled to the server 102 through network 108.

The content engine 122 can include any software, hardware, and/or firmware configured to generate list views in the electronic documents 114. For example, the content engine 122 may generate a list of content identified by the content providers 106 and populate an associated electronic document 114 with the generated list. Thus, the content engine 122 may be operable to identify one or more list profiles 116 in response to a request from a client device 104, transmit requests to one or more servers (e.g., providers 106 or search engine databases containing information previously obtained from content providers 106) in accordance with the identified profiles 116, receive responses from the one or more servers identifying content responsive to the request, generate one or more lists based, at least in part, on the identified content and populate one or more electronic documents 114 with the one or more lists. In some implementations, the content engine 122 can identify servers containing information relevant to the request from the client device 102 based, at least in part, on the list profiles 116 and can transmit requests for responsive data to such servers. In generating list views, the content engine 122 may populate the electronic documents with metadata (e.g., for generating an unexpanded view and an expanded view for each item) based on the list profiles 116. In addition, the content engine 122 may include in the electronic document 114 additional information defining which metadata should be presented in expanded and unexpanded items based on which sort criteria are selected by a user.

The request engine 124 can include any software, hardware, and/or firmware configured to receive a request from a client device 104 and transmit an electronic document 114 to a client 104 in response to the request. For example, the request engine 124 may receive a request identifying search parameters or a specific electronic document 114 and transmit a responsive electronic document 114 to the client 104.

While the content engine 122 and the request engine 124 are illustrated in FIG. 1 as including individual modules, each of the content engine 122 and the request engine 124 may include numerous other sub-modules or may instead be a single multi-tasked module that implements the various features and functionality. Further, while illustrated as internal to server 102, one or more processes associated with the content engine 122 and/or the request engine 124 may be stored, referenced, or executed remotely at one or more other servers. Moreover, the content engine 122 and/or the request engine 124 may be a child or sub-module of another software module or enterprise application (not illustrated). In some implementations, a content engine 122, the request engine 124, the memory 110, the list profiles 116, the electronic documents 114, a content provider 106, and/or other components of the system 100 can be implemented locally on a device, for example, to enable searching and display of data stored locally on the device.

Clients 104a-c can include any devices (e.g., computing devices) operable to connect or communicate with the server 102 or otherwise communicate across the network 108. Each client 104 is operable to present a GUI 126 and to receive, transmit, process, and store data relating to a request. While the illustrated implementation includes clients 104a-c, system 100 may include any number of clients 104 communicably coupled to the server 102. Client 104 can be, for example, a personal computer, touch screen terminal, workstation, network computer, kiosk, wireless data port, smart phone, personal data assistant (PDA), one or more processors within these or other devices, or any other suitable processing or electronic device used by a user viewing content from the server 102. For example, the client 104 may be a PDA operable to wirelessly connect with an external or unsecured network. In another example, the client 104 may be a laptop that includes an input device, such as a keypad, touch screen, mouse, or other device that can accept information, and an output device that displays content aggregated by the server 102, including at least GUI 126. Both the input device and output device may include fixed or removable storage media to both receive input from and provide output to users of clients 104 through the display.

The GUI 126 may include customizable frames or views having interactive fields, pull-down lists, graphical buttons, and/or other user interface components that can be manipulated by a user. The GUI 126 can be configurable, supporting a combination of graphical elements (e.g., fields, buttons), to present the information in the electronic documents 114. The GUI 126 can be a generic web browser or touch screen, that processes information in the system 100 and presents the results to the user. The server 102 can accept data from the client 104 via the web browser (e.g., Microsoft Internet Explorer™ or Google Chrome™) and return the appropriate HTML, XML, and/or other responses to the browser using the network 108.

Figure 2A:
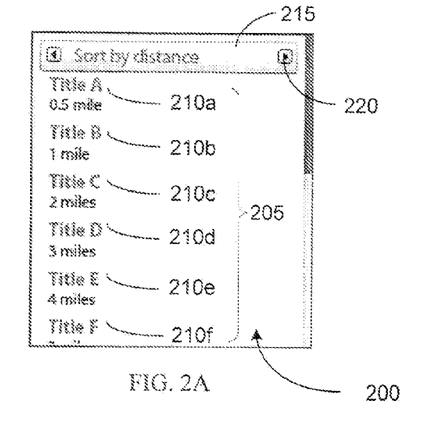
FIGS. 2A, 2B, 2C, 2D, 2E, and 2F are example web pages including list views that automatically expand and contract in response to a user navigating between items.
Figure 2B:
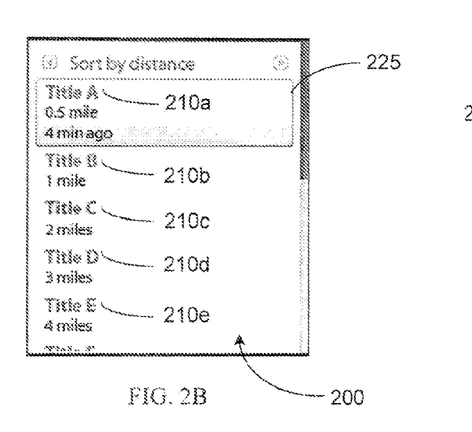
Figure 2C:
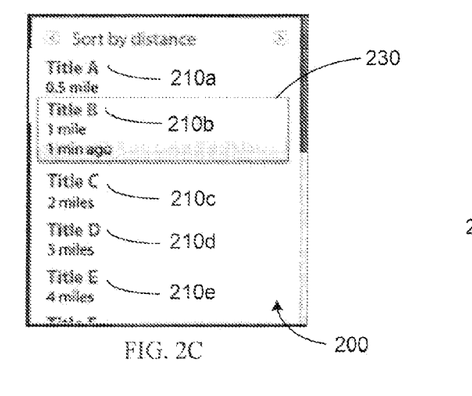
Figure 2D:
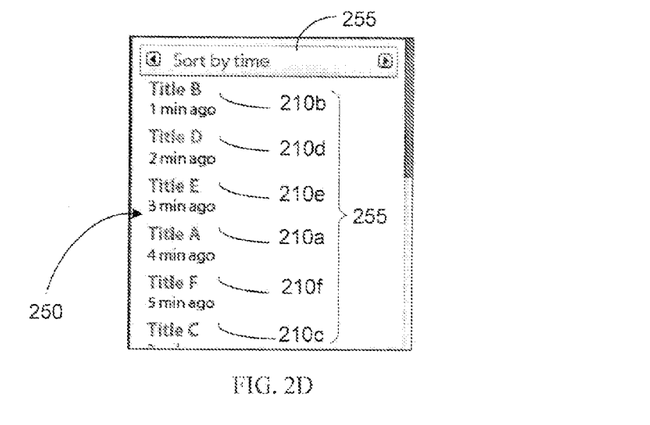
Figure 2E:
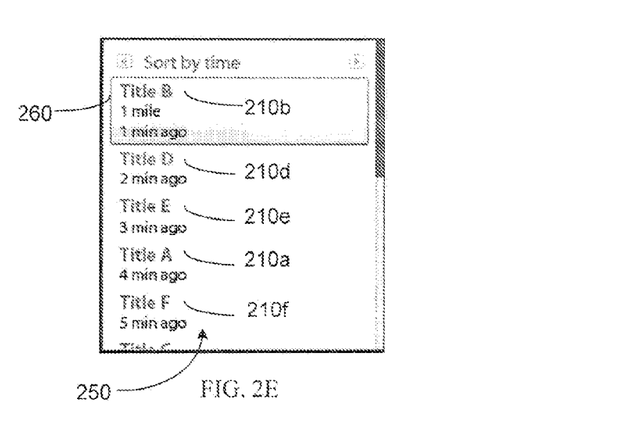
Figure 2F:
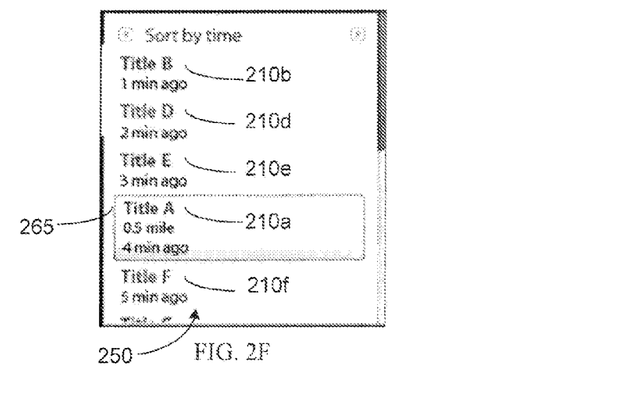

FIGS. 2A, 2B, 2C, 2D, 2E, and 2F are example web pages 200 and 250 including list views 205 and 255 that automatically expand and contract in response to a user navigating between items. The web pages 200 and 250 can be presented on a user device, e.g., a mobile device. Each web page 200 and 250 can be defined by an electronic document received from a remote server, such as search engine server 102. In this example, FIGS. 2A, 2B, and 2C present a list view 205 of items (e.g., businesses or attractions) sorted according to distance (e.g., distance from the mobile device's current location), while FIGS. 2D, 2E, and 2F present a list view 255 of the same items sorted according to time (e.g., driving time from the mobile device's current location). The illustrated pages are for example purposes only, and the web pages presented in accordance with the techniques described in this specification may include different or additional information.

As shown in FIG. 2A, the web page 200 includes a list view 205 presenting multiple items 210a-f. In addition, the list view 205 includes a sort criteria user interface component 215. As illustrated in this example, display focus is currently on the sort criteria user interface component 215, as indicated by the box in which the user has currently selected a sort criterion of "sort by distance." Accordingly, the items 210a-f are sorted according to distance from the mobile device's current location. Arrows 220 provide user interface controls for navigating to and/or indicate the availability of additional sort criteria. Each of the items 210a-f in the list is in a contracted or unexpanded state and thus includes only a title or name of the item and a distance from the mobile device's current location.

In response to a user scrolling from the sort criteria user interface component 215 to the first item 210a in the list, the expansion module 120 moves the display focus to the first item 210a, as indicated by the box illustrated in FIG. 2B. Along with moving display focus, the expansion module 120 also automatically expands the item 210a to present an expanded view 225. In the expanded view 225, additional information about the item 210a is presented. In this example, the additional information includes travel time from the mobile device's current location. The travel time information can be included as metadata corresponding to the item 210a in the electronic document that defines the web page 200 received from a remote server. For example, the electronic document that defines the web page 200 can include multiple categories of metadata, which may include, in this example, at least time and distance information or information from which time and distance can be calculated.

Each item 210a-f in the list can include one or more values corresponding to each metadata category. For example, the categories of metadata can include the estimated driving (and/or walking) time and the distance from the location of the mobile device when it requested the web page 200 from the server, and each item 210a-f can have corresponding metadata values for the time and distance categories. The values can be calculated by a remote server based on the mobile device's known location determined by the system 100 or communicated from the mobile device along with the request. Alternatively, the received metadata can include a location of each item 210a-f and information about possible routes to the location in the vicinity of the mobile device. The mobile device, e.g., using logic included in the list module or other software on the mobile device, can then calculate the time and distance values based on the mobile device's current location. Alternatively, the time and distance values can be periodically updated by sending update messages from the server based on updated mobile device location information as the mobile device is moved. Thus, the received metadata can include static information (e.g., fixed location of an item) and/or dynamic or calculated information. For example, dynamic or calculated metadata can include distance from a current mobile device location to an item, affinity (e.g., number of times a user interacts with another person or source, or other information determined based on data supplied by or associated with the user or the user device. Likewise, the displayed metadata can also include static information and/or dynamic or calculated information, the latter of which can be determined or calculated remotely at a server or locally at the client device.

In some implementations, additional metadata can also be included in the expanded view 225. Moreover, the subset of categories of metadata that are included in the expanded (and in some cases the unexpanded) view can be identified from multiple available categories of metadata based on the particular sort criterion that is selected. Thus, different subsets of metadata can be presented for an item 210a-f for different sort criteria, as defined for example in the electronic document 114 received from the server. In some implementations, a name of the metadata category can be presented along with the metadata value (e.g., "time to location: 3 minutes"). In addition, additional metadata beyond that presented in the expanded view 225 can be presented in response to the user selecting the expanded view 225 of an item, e.g., item 210a (e.g., by double tapping the expanded view 225 on a touch screen or clicking within the boundaries of the expanded view 225 with a mouse).

When display focus is on the first item 210a, other items 210b-f in the list view 205 remain in an unexpanded form. However, as illustrated in FIG. 2C, as a user scrolls or navigates to a second item 210b in the list, display focus is moved to the newly selected item 210b which can be presented in an expanded view 230 with an additional metadata value for travel time to the location of the selected item 210b. At the same time, the first item 210a can be changed back to an unexpanded view while the remaining items 210c-f remain in unexpanded form. In some implementations, a user can navigate (e.g., through a mouse click or a touch screen tap) to a second item (e.g., item 210e) that is not adjacent to the first item 210a without scrolling through the intermediate items 210b and 210c. Thus, which of the items is designated as first, second, third, and so on can in some instances refer to the sequence of the items, in other instances can refer to the order in which items are expanded, and in still other instances refer to some other arbitrary sequence of selection (e.g., item 210 may be designated as the first selected item and item 210d may be designated as the second selected item even if items 210b and 210c are selected in the interim). The process of expanding a newly selected item and unexpanding a previously selected item can be repeated any number of times, e.g., as the user scrolls up and down the list view 205. In addition, the user can navigate back to placing display focus is on the sort criteria user interface component 215, as shown in FIG. 2A. Using the sort criteria user interface component 215, a user can also select an alternative sort criterion using arrows 220 (e.g., by selecting one of the arrows 220 with a mouse click or touch screen tap) or, e.g., by swiping a finger across the sort criteria user interface component 215 to move in the direction of one of the arrows 220.

FIG. 2D illustrates the web page 250 after a user has navigated to an alternative sort criterion in the sort criteria user interface component 255. As illustrated in this example, display focus is thus on the sort criteria user interface component 255 in which the selected sort criterion is "sort by time." In response to selecting the new sort criterion, the items 210a-f are re-sequenced according to the new sort criterion as illustrated in FIG. 2D. In addition, the unexpanded views of the items 210a-f are updated to include metadata values corresponding to the new sort criterion. In particular, each item 210a-f includes the same title as shown in FIGS. 2A, 2B, and 2C but includes values for travel time to the location of the respective items 210a-f instead of distance to the respective items 210a-f. The user can again navigate to individual items 210a-f in the web page 250 to place display focus on an individual selected item and reveal the expanded view of the selected item.

FIG. 2E illustrates the web page 250 after a user has navigated to a first item 210b in the list view 255 of web page 250. In this case, the first item 210b is presented in an expanded view 260, which includes distance to the location of the item 210b in addition to travel time to the location of the item 210b. The values of the metadata categories selected for inclusion in the expanded view can be presented in any desired sequence as selected by the operators of the server and/or in accordance with user preferences.

As illustrated in FIG. 2F, a user can navigate to other items 210a and 210c-f, resulting in the web page 250 being modified to present the first item 210b in unexpanded form, the newly selected item (e.g., item 210a) in an expanded view 265, and all other items (e.g., items 210c-f) in unexpanded form. The user can also navigate back to the sort criteria user interface component 255 (e.g., as shown in FIG. 2D) to select a different sort criteria. In some implementations, the web pages 200 and 250 can also include additional user interface components (e.g., for submitting new or refined search or data retrieval requests).

Figure 3:
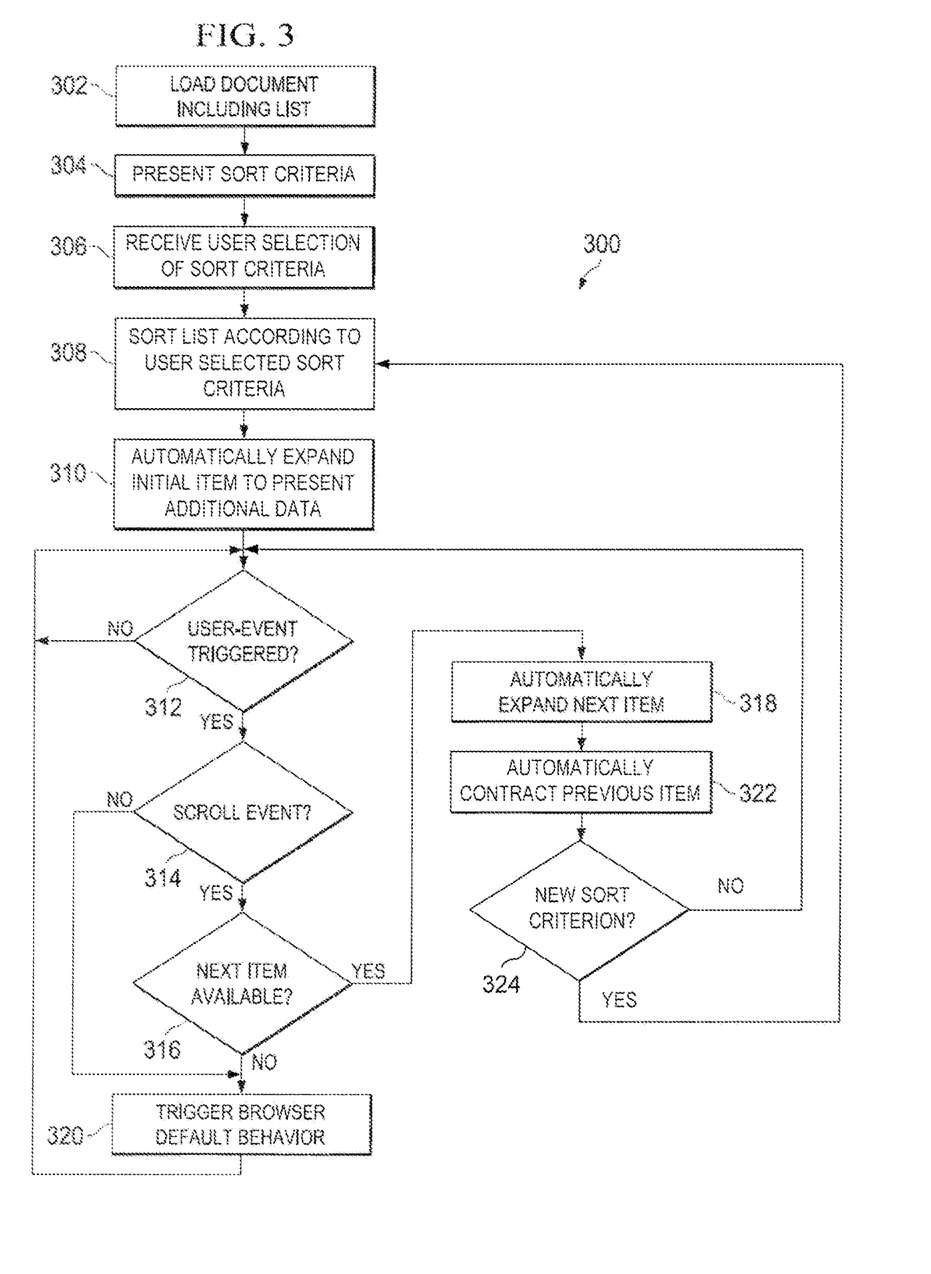
FIG. 3 is a flowchart illustrating a process for presenting expanded and unexpanded search results based on selected sort criteria.

FIG. 3 is a flowchart illustrating a process 300 for presenting expanded and unexpanded search results based on selected sort criteria. Generally, the process 300 describes an example technique for automatically expanding and contracting views of items in response to a user event. At 302, a document including a list of items is loaded onto a device for display. For example, the client 104a of FIG. 1 can load an electronic document 114 that includes a list of items. The electronic document 114 can include a metadata associated with the items in the list. For example, the metadata can be separated into categories, with each item including a value for each metadata category. Loading the electronic document 114 can include presenting the list of items, or a portion of the list, on a display screen of the device. Initially, the list of items can be presented in unexpanded form, such that each item is identified by a title or other identifying information. In addition, the unexpanded form for each item can include one or more additional metadata values associated with the item.

At 304, available sort criteria are presented for selection by a user. For example, the sort criteria can be presented in a drop down list or other user interface component. The available sort criteria can be a subset of available metadata categories. In some implementations, the list of items can be initially sorted, upon loading, according to a default sort criterion.

At 306, a selected sort criteria is received. At 308, the list is sorted according to the selected sort criterion. The device display can be updated with the newly sorted list. Each time a different sort criterion is received, the unexpanded view of each item can be modified to include at least the value for each item of the metadata in the selected metadata category. In some implementations, other metadata can be preselected as corresponding to the sort criterion and presented in the unexpanded view. In addition, additional metadata, beyond that to be presented in the unexpanded view, can be identified as corresponding to the sort criterion for presentation in an expanded view.

In some implementations, an initial item in the list can optionally be automatically presented in expanded view at 310 following selection of a sort criterion. The expanded view includes one or more values of metadata that are not included in the unexpanded view. The metadata categories from which this additional value or values are selected can be dependent upon the selected sort criterion. For example, in a search for items in an online store, if items are sorted according to price, the unexpanded view can include the price of each item, while the expanded view can include shipping costs and taxes. If the same list is sorted according to user reviews (e.g., by ranking items according to user ratings), the unexpanded view can show an average rating, while the expanded view can include snippets from user reviews and/or additional product specifications or other information.

In some implementations, the metadata that is presented in the expanded view can be the same regardless of which sort criterion is selected. For example, the unexpanded view can include only a title or other identification of the item and the associated value of the metadata category selected as the sort criterion, while the unexpanded view can include all of the metadata values available for presentation to the user. In this type of implementation, however, the metadata values that are added in the expanded view, compared to what is displayed in the unexpanded view, will change because the metadata value that is displayed in the unexpanded view changes depending on which sort criterion is selected. For example, in a search of real estate listings, a list of results can be returned from a remote server along with metadata identifying the address of the listing, the price, whether and when the listing has an open house scheduled, and an image of the listed property. If the items are first sorted according to distance from a mobile device's current location, the unexpanded view may include the address (e.g., as an identifier of the property) and the distance. If a user selects to have the properties re-sorted according to price, the unexpanded view may include the address and the price. The expanded view in both cases may include the address, distance, price, open house information, and property image, but what is added to the expanded view relative to the unexpanded view is different for the first sort (e.g., which adds the price, open house information, and property image) than for the second sort (e.g., which adds the distance, open house information, and property image).

At 312, a determination is made whether a user event is triggered. For example, the user even could be contacted with a touch screen or movement and/or clicking of a mouse. If a user event is triggered at 312, then the process 300 may determine if the user-triggered event is a scroll event at 314. If so, a determination whether a next item is available is made at 316. If either the user-triggered event is not a scroll event or a next item is not available, then a browser default behavior is triggered at 320 and the process 300 returns to 312. If a next item is available, that item is expanded at 318 to include additional information related to that item and the initially or previously expanded item is contracted at 322 to include less information about that previous item. For example, the display of the next item is switched from an unexpanded view to an expanded view, and the display of the initial or previous item is switched from an expanded view to an unexpanded view. In some cases, the next item can be a user interface component for selecting a new sort criterion (e.g., the sort criteria user interface component 250 of FIG. 2A or the sort criteria user interface component 255 of FIG. 2D), in which case all (or most) of the items in list can be displayed in unexpanded form and display focus can be placed on the sort criteria user interface component. At 324, a determination is made whether a new sort criterion is received (e.g., through a user interaction). If not, the process 300 returns to 312 to await detection of a new user event. If a new sort criterion is received, the process 300 returns to 308 to sort the list according to the new sort criterion.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a computer readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal, that is generated to encode information for transmission to suitable receiver apparatus for execution by a computer. The computer readable storage device can be a machine-readable storage device, a machine-readable storage substrate, a memory device, or a combination of one or more of them.

The terms "processor" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of any invention or of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   providing, for presentation, data identifying a plurality of sort criteria for sorting items, each item being associated with a plurality of fields of metadata, and each sort criterion corresponding to a particular field of metadata of the items;
   receiving an identification of a selected sort criterion selected from the plurality of sort criteria;
   identifying, based on the selected sort criterion, one or more predetermined fields of metadata to include in an expanded view of the items and to not include in an unexpanded view of the items, wherein each particular sort criterion has a different set of one or more predetermined fields of metadata to include in the expanded view when the particular sort criterion is selected;
   generating a user interface display by operation of a computer, wherein the user interface display includes a first list of items, including at least a first item and a second item, sorted according to the selected sort criterion and further includes the expanded view of the first item in a first display position on the user interface display and an unexpanded view of other items in the first list of items including at least the second item, the expanded view including a display of the one or more predetermined fields of metadata not included in the unexpanded view and one predetermined field of metadata included in the unexpanded view;
   receiving a request to move display focus to the second item in the first list of items by moving the second item to the first display position; and
   in response to the request, moving the second item from a previous display position of the second item to the first display position and presenting an expanded view of the second item in the first display position, wherein the expanded view of the second item includes a display of the one or more predetermined fields of metadata not included in the unexpanded view.

2. The method of claim 1, wherein the selected sort criterion is identified from the plurality of fields of metadata.

3. The method of claim 2, wherein the unexpanded view includes data from a field of metadata identified as the selected sort criterion.

4. The method of claim 1, further comprising:
   receiving an identification of a second selected sort criterion for listing items; and
   modifying the user interface display to sort items in a second list of items according to the second selected sort criterion, wherein the modified user interface display includes an expanded view of a particular item in the second list of items and an unexpanded view of other items in the second list of items, the expanded view of the particular item including a display of a field of metadata not included in the unexpanded view.

5. The method of claim 4, wherein the expanded view of the particular item includes a display of a field of metadata not included in the expanded view of the first item in the first list of items.

6. The method of claim 1, further comprising changing the view of the first item from the expanded view to the unexpanded view upon presenting an expanded view of the second item.

7. The method of claim 1, wherein the expanded view of the first item and the expanded view of the second item are each presented at a predefined relative position in the user interface display.

8. The method of claim 1, wherein each item in the listing of items includes a search result in a set of search results.

9. The method of claim 1, further comprising:
receiving a user parameter;
generating, for each item in the first list of items, a value for a field of metadata based on the user parameter; and
displaying the value for at least one item in at least one of the expanded view or the unexpanded view.

10. The method of claim 1, wherein the selected sort criterion includes a selected combination of fields of metadata from the plurality of fields of metadata.

11. The method of claim 1, wherein the user interface display is presented on a handheld mobile device.

12. The method of claim 1, wherein the selected sort criterion is identified from a predefined subset of the plurality of fields of metadata, the method further comprising:
displaying a user interface component identifying the predefined subset, wherein the selected sort criterion is identified through a user interaction with the user interface component.

13. The method of claim 1, further comprising selecting the one or more predetermined fields of metadata based on the selected sort criterion and irrespective of a type of item for each item in the first list of items.

14. The method of claim 1, wherein:
the request comprises a request to scroll through the display of the first list of items until the second item is displayed at the first display position; and
the expanded view of the second item is presented in response to the second item being presented in the first display position.

15. The method of claim 1, further comprising determining to present the first item in the expanded view in response to the first item being presented in the first display position.

16. The method of claim 1, further comprising:
determining that the first display position meets an expansion threshold location; and
in response to determining that the first display position meets the expansion threshold location, presenting the expanded view of the first item.

17. The method of claim 1, wherein no more than one item in the first list of items is presented in the expanded view at one time.

18. The method of claim 1, wherein each item of the first list of items includes an image.

19. The method of claim 1, wherein the first item includes an image, the image being displayed in at least one of the expanded view or the unexpanded view.

20. The method of claim 1, further comprising:
receiving an identification of a second selected sort criterion selected from the plurality of sort criteria, the second selected sort criterion being different from the selected sort criterion; and
in response to receiving an identification of a second selected sort criterion:
identifying the set of one or more predetermined fields of metadata of the second selected sort criterion; and
updating the user interface display to display, for each item displayed in the first display position, the one or more predetermined fields of metadata of the second selected sort criterion.

21. A system comprising:
one or more computers; and
one or more data storage devices storing instructions for causing at least one of the one or more computers to perform operations including:
providing, for presentation, data identifying a plurality of sort criteria for sorting items, each item being associated with a plurality of fields of metadata, and each sort criterion corresponding to a particular field of metadata of the items;
receiving an identification of a selected sort criterion selected from the plurality of sort criteria;
identifying, based on the selected sort criterion, one or more predetermined fields of metadata to include in an expanded view of the items and to not include in an unexpanded view of the items, wherein each particular sort criterion has a different set of one or more predetermined fields of metadata to include in the expanded view when the particular sort criterion is selected;
generating a user interface display, wherein the user interface display includes a list of items, including at least a first item and a second item, sorted according to the selected sort criterion and further includes the expanded view of the first item and an unexpanded view of other items in the list of items including at least the second item, the expanded view displaying the one or more predetermined fields of metadata not included in the unexpanded view and one predetermined field of metadata included in the unexpanded view;
receiving a request to change display focus to the second item in the list of items by moving the second item to the first display position; and
in response to the request, moving the second item from a previous display position of the second item to the first display position and presenting an expanded view of the second item in the first display position, wherein the expanded view of the second item includes a display of the one or more predetermined fields of metadata not included in the unexpanded view.

22. The system of claim 21, wherein the one or more data storage devices store instructions for further causing at least one of the one or more computers to identify the one or more predetermined fields of metadata included in the expanded view based at least in part on the selected sort criterion.

23. The system of claim 21, wherein at least one of the one or more computers includes a handheld mobile device having a display screen adapted to display the user interface display and a user interface adapted to receive input from a user including identifications of selected sort criteria and requests to change display focus.

24. The system of claim 23, wherein a data storage device of the handheld mobile device stores instructions for specifying which of the plurality of fields of metadata are selectively displayed in the expanded view based on which of a plurality of available sort criteria is selected.

25. The system of claim 21, further comprising a search engine adapted to receive a search request and to generate search results including the items in the list of items, wherein each item includes identifying information for at least one of the search results.

* * * * *